United States Patent Office 3,090,600
Patented May 21, 1963

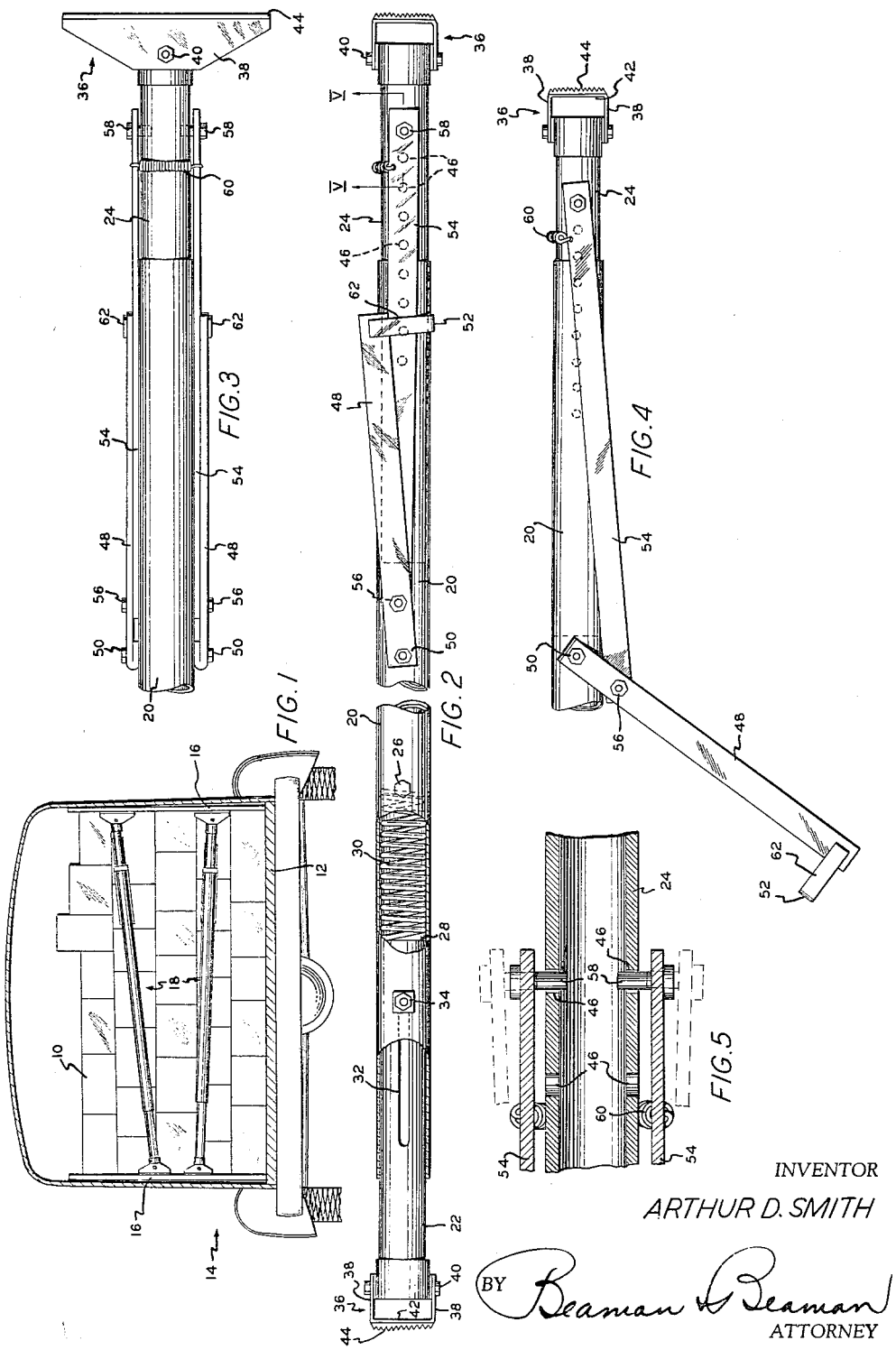

3,090,600
VEHICLE LOAD RETAINER
Arthur D. Smith, 900 Winifred St., Jackson, Mich.
Filed Aug. 31, 1960, Ser. No. 53,099
1 Claim. (Cl. 254—116)

The invention pertains to a vehicle load retainer or brace and particularly, is concerned with a dunnage bar type of brace which is interposed between opposed walls of a load space.

The transportation of cartons, boxes and other containers which are stacked upon each other during shipping often results in the containers shifting, tipping and becoming generally disarranged if means are not provided to maintain the proper stacking relationship. It has been common practice to employ dunnage elements for preventing the shifting of loads within freight cars, boat hulls and truck beds and the invention relates to a lightweight, portable load retainer which is adapted for this usage and is particularly suitable with truck loads. While dunnage equipment minimizes load breaking due to load shifting, most conventional dunnage devices are of such large bulk and weight that truck drivers and dock loaders often fail to employ these devices to their best advantage and many times, dispense with them entirely at the sacrifice of the load safety. It is, therefore, one of the primary purposes of the invention to provide a dunnage or load retainer which is concise and of light weight and which may be very easily and quickly handled, positioned and operated.

Another object of the invention is to provide a load retainer which is readily adjustable to accommodate various sized loaded areas and employs a spring biased friction force to maintain the retainer in the proper position.

Yet another object of the invention is to provide a vehicle load retainer wherein connection of the retainer to the vehicle is through friction means and eliminated the need for vehicle modification and special adapters or anchors located upon the vehicle.

Another object of the invention is to provide a vehicle load retainer or brace wherein the longitudinal axis of the brace may be variable angularly related to the surfaces supporting the brace and wherein the forces maintaining the brace in position are readily produced manually.

These and other objects of the invention arising from the structural details and relationships of components of an embodiment thereof will be apparent from the following specification and accompanying drawings wherein:

FIG. 1 is an end elevational view of a loaded truck wherein two load retainers in accord with the invention are employed to prevent shifting of the load, FIG. 2 is a plan view, partly in section, of a load brace in accord with the invention, FIG. 3 is a detail elevational view of the manually adjusted end of a load brace in the extended position in accord with the invention, FIG. 4 is a detail plan view of the manually adjusted end of the brace of the invention illustrating the lever structure in the retracted position and FIG. 5 is a cross-sectional enlarged view of a detail of the links and manually adjusted end as taken along section V—V of FIG. 2.

The relationship of the load brace or retainer in accord with the invention to a load consisting of a plurality of stacked cartons 10 located upon the bed 12 of a truck 14 will be apparent from FIG. 1. The truck bed body is provided with vertically extending side walls having inner panels 16 and enclosed by a roof and upon completing the stacking of the cartons 10 within the truck bed, the brace, generally indicated at 18, is located transversely across the truck bed in engagement with the walls 16 and adjacent the stacked cartons or containers. The ends of the brace 18 frictionally engage the opposed side walls 16 of the truck and, hence, prevent the cartons from shifting rearward upon the truck bed. Usually, one brace member will suffice, however, two or more brace members may be employed if desired. It will be understood that the brace members may be vertically disposed upon the truck bed, if desired, one end thereof engaging the roof and the other contacting the bed 12.

Basically, the brace 18 of the invention consists of an elongated tubular body element 20 slidably receiving and supporting telescoped members 22 and 24 at opposite ends thereof. In the preferred embodiment, the tubular element 20 is of cylindrical configuration having a cylindrical bore and the elements 22 and 24 are likewise of cylindrical tubular construction.

The left end, FIG. 2, of the brace produces the spring biasing force which maintains the ends of the brace in frictional engagement with the side walls of the loaded area. A spring anchor, comprising a bolt 26 or similar member extends diametrically through the central cylindrical body 20 and is located in spaced relationship to the inner end 28 of the telescopic member 22. A compression spring 30 is interposed between the end 28 and the anchor 26 within the element 20 and may be precompressed such that this spring constantly urges the member 22 to the left relative to the cylindrical body element 20. A keyway or keygroove 32 is defined in the telescoping member 22 and a key which may consist of a bolt 34 affixed to the body 20 extending into the groove 32 cooperates with the groove to prevent rotation of the member 22 relative to the body 20. The outer end of the cylindrical member 22 is provided with a U-shaped shoe 36 having leg portions 38 pivotally mounted to the end of the member 22 by pivot 40. The base 42 of the shoe is preferably covered with a rubber or high friction material 44 having a gripping surface.

The manually adjusted end of the brace, the right end in FIG. 2, likewise includes a cylindrical telescoping member 24 slidably received within the bore of the body 20. Cylindrical member 24 is provided with an outer end having a shoe 36 affixed thereto as in the manner described above in relation to the spring biased brace end. In that the shoe members 36 are relatively pivotal about the pivots 40, this permits the brace to be selectively angularly related to the brace supporting surface as illustrated in FIG. 1. A plurality of diametrically opposed holes 46 are formed in the cylindrical member 24 axially spaced therealong for receiving the pins of the connecting links as will be later described.

A pair of lever arms 48, FIG. 3, are pivotally mounted on opposite sides of the tubular body 20 by means of pivots 50 connected to the body. The arms 48 are interconnected adjacent their outer end by a U-shaped bridge 52. A pair of linkage members 54 are also mounted on opposite sides of the cylindrical body 20, each linkage being pivotally connected by a pivot 56 to an arm 48 at its inner end. The outer end of the linkage members 54 is provided with an inwardly extending pin 58, FIG. 5, which may be received within the holes 46 of the element 24. A spring 60 interconnects the outer ends of the linkages 54 and biases the linkages toward the member 24. It will be noted that the spring 60 must pass around approximately one-half of the circumference of the cylindrical member 24 in connecting the two linkages together.

In operation, the brace member is initially adjusted to the width of the load space of the particular vehicle with which it will be employed. In doing so, the operator grasps the outer ends of the linkages 54 and pulls the linkages away from the cylindrical member 24 to disengage the pins 58 from the holes 46, as shown in the dotted lines of FIG. 5. It will be appreciated that the operator must overcome the force of the spring 60 to accomplish this action. Thereupon, the cylindrical member 24 may be axially adjusted relative to the body 20 such that the over-all length of the brace when in the unextended position, as in FIG. 4, is substantially equal to the width of the vehicle loaded area. Thereupon the linkages are released and the pins 58 are aligned with a pair of holes 46 to maintain the desired brace length. A sufficient number of holes 46 is provided to accommodate a large variety of vehicle sizes and the cylindrical body 20 may be furnished in several different lengths to accommodate wide varieties in vehicle widths. After the pins 58 are received within the proper holes 46 the operator fully retracts the brace by rotating the lever arms 48 clockwise to the position of FIG. 4 and the U-shaped bridge 52 may be used as a handle during this operation. Rotating the lever arms in this direction will pull the cylindrical member 24 into the tubular body 20 and permit the operator to locate the brace relative to the load and vehicle walls as desired.

Thereupon, the levers 48 are rotated in a counterclockwise direction which causes the cylindrical member 24 to move outwardly with respect to the body 20. As the shoes 36 of the brace engage the inner walls or panels of the vehicle body, the further movement of the levers 48 in a counterclockwise direction will tend to compress the spring 30 due to the resistance offered against extension of the brace length by the vehicle walls and the operator continues counterclockwise rotation of the lever arms until the base of the U-shaped bridge 52 engages the cylindrical body 20 as shown in FIG. 2. At this time, the spring 30 will be compressed and maintain the shoes of the brace in a firm frictional engagement with the vehicle walls. The brace is now in its operative position.

The brace is locked in this position due to the fact that the legs 62 of the bridge 52 are of such length that the lever arms 48 have passed beyond the longitudinal axial direction of the brace body 20 such that the pivots 56 are beyond center with respect to a line interconnecting the pivots 50 with the center of the pins 58. Thus, an "off-center" locking relationship is achieved.

To remove the brace, the operator may grasp the bridge 52 or the lever arms 48 and rotate the same in a clockwise direction, FIGS. 2 and 4, to the position of FIG. 4 which will permit him to remove the brace from the vehicle.

It will be noted that the spring 60 serves in a dual capacity in that besides maintaining engagement of the pins 58 with the holes 46, the spring 60 will also tend to pull the linkages 54 in an upward direction, FIG. 2, which aids in preventing vibration from tending to unlock the brace when in the extended position. It will also be appreciated that the components of the invention may be constructed of conventional and easily fabricated materials in that the tubular components may be constructed of conduit or piping and the levers, linkages and leg members may be readily formed of stamped and commercially available stock.

It is understood that various modifications to the described embodiments may be apparent to those skilled in the art without departing from the spirit and scope of the invention and it is intended that the invention be defined only by the following claim.

I claim:

A load retaining brace comprising, in combination, a tubular body member, first and second members telescopingly received within the opposite ends of said body member and slidably supported therein, spring means within said body member longitudinally biasing said first member outwardly therefrom, a pair of lever members pivotally mounted at one end to said body member on diametrically opposite sides thereon on a common pivot axis, a U-shaped bridge member interconnecting said levers remote from said lever pivot end, a pair of links pivotally attached at one end to said levers intermediate the pivot axis thereof and said bridge and pivotally connected at the other end to said second member whereby pivoting of said levers longitudinally positions said second member and relative to said body member, said bridge engages said body member after the pivot axis of said one end of said links has passed through a straight line connecting the pivot axis of said link's other end and said common pivot axis of said levers thus providing an overcenter locking of said levers, pivotally mounted shoe members affixed to the outer ends of said first and second members, a plurality of longitudinally spaced holes defined in diametrically opposed relation on opposite sides of said second member, a pin mounted on said other end of each of said links projecting toward each other and selectively receivable within said holes constituting the pivot connection between said links and second member and spring means interposed between said other ends of said links maintaining said pins within said holes.

References Cited in the file of this patent

UNITED STATES PATENTS

| | | |
|---|---|---|
| 891,897 | Astrom | June 30, 1908 |
| 1,158,192 | Ette | Oct. 26, 1915 |
| 1,208,285 | Burkholder | Dec. 12, 1916 |
| 1,548,053 | Mead | Aug. 4, 1925 |
| 2,631,009 | Jordan | Mar. 10, 1953 |
| 2,665,109 | Romby | Jan. 5, 1954 |

FOREIGN PATENTS

| | | |
|---|---|---|
| 73,548 | Switzerland | May 3, 1916 |
| 1,281,936 | France | Oct. 15, 1918 |
| 236,327 | Great Britain | July 9, 1925 |
| 64,968 | Netherlands | Dec. 15, 1949 |
| 796,701 | Great Britain | June 18, 1958 |